G. M. Bird,
Variable Valve Gear.

No. 99,052.           Patented Jan. 25, 1870.

Witnesses.          Inventor.
Dana B. Hanson          Geo. M. Bird
D. E. Whitney

United States Patent Office.

GEORGE M. BIRD, OF DEDHAM, MASSACHUSETTS.

Letters Patent No. 99,052, dated January 25, 1870.

VARIABLE VALVE-GEAR.

The Schedule referred to in these Letters Patent and making part of the same.

I, GEORGE M. BIRD, of Dedham, in the county of Norfolk, and State of Massachusetts, have invented a new and useful "Variable Crank-Motion," for Operating the Valves of Steam-Engines, and for other purposes, of which the following is a specification.

The object of my invention is to provide a means of operating the valves of steam-engines and for other purposes, where a variable motion is required, that can be controlled or varied at pleasure by hand, or by a governor, while the engine or machine is in operation.

My invention relates to the means employed to change the position of the crank-pin, or equivalent device, which imparts motion to the valves while the engine is in motion; and It consists in the use of a short hollow shaft or hub, mounted in suitable bearings, and driven by gearing from the crank-shaft of the engine, and having a disk or plate carrying a crank-pin, or equivalent device, which gives motion to the valve, said disk being fitted in bearings attached to the end of said shaft, so as to slide in a direction at right angles to the axis of the same, and a cam, or its equivalent for giving motion to said disk, said cam being operated by any suitable means through said hollow shaft, as will be more fully described.

In the accompanying drawings, forming a part of this specification—

Figure 3:
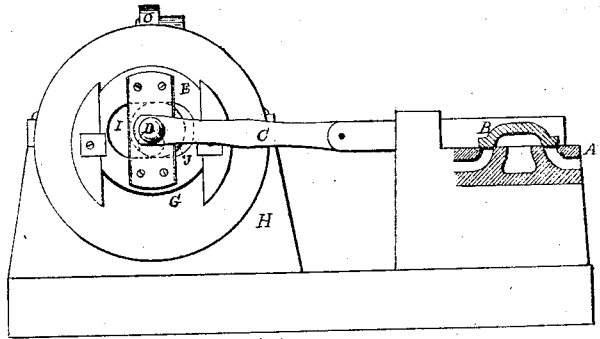
Figure 3 is a side elevation.
Figures 2, 4:
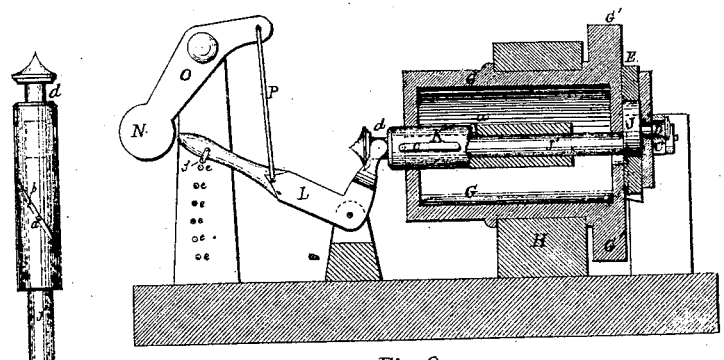
Figure 2 is a vertical section of the same, taken on line $x\,x$ on fig. 1.
Figure 4 is a plan, in detail, of the eccentric cam, its shaft, and the sleeve by which it is rotated.
Figure 1:
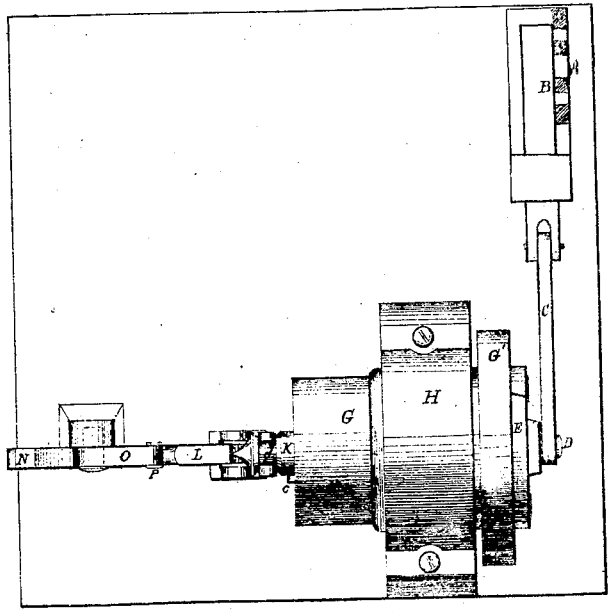
Figure 1 is a plan of a machine embodying my invention.

A represents the valve-seat, showing the steam and exhaust-ports in section.

B is the valve, and C, the connecting-rod, through which the motion of the crank-pin D is transmitted to the valve.

The crank-pin D is set in or forms a part of the disk or plate E, which is fitted in bearings formed on the end of the short hollow shaft or hub G, so as to slide in a direction at right angles to the axis of said shaft.

H is a pillow-block, which forms the bearing for the shaft G.

G' is intended to represent a spur-gear (the teeth not being represented) to mesh into a corresponding gear on the main crank-shaft of the engine, not shown.

The disk or plate E is provided with an oblong slot, I, in which the eccentric cam J works, by the revolution of which the position of the plate E and the crank D is made to vary, and give more or less throw to the valve B.

The cam J is mounted upon or forms a part of a shaft or spindle, J', which extends through the centre of the hollow shaft G, in the line of its axis, and is fitted into the sleeve K, and provided with a pin, $a$, set firmly in the shaft J', and fitted to a spiral groove or slot, $b$, cut in one side of the sleeve K.

The sleeve K is fitted to a bearing in the back end of the shaft G, and connected to it by a feather or spline, $c$, in such a manner that it is compelled to revolve with the shaft G, and, by the pin $a$, carries the cam J with it, and thereby maintains the cam J in the same relation to the crank-pin D, so long as the sleeve is not moved in the direction of its axis, while at the same time the sleeve K may be moved in the direction of its length, by raising or depressing the long arm of the elbow-lever L, and by the action of the spiral groove $b$ upon the pin $a$ set in the shaft J', give to the cam J a partial rotation, and by its action upon the disk or plate E, cause the position of the crank-pin D to be changed, so as to give more or less throw to the valve, without stopping the engine.

N represents one of the balls of a governor, and O, its lever, to the short arm of which is attached the link P, the lower end of which is connected to the long arm of the lever L, whenever it is desirable to control the motion of the valve by the action of the governor.

The outer end of the sleeve K has a groove, $d$, cut around it, into which the forked end of the lever L is fitted, and by which the sleeve K is moved endwise when the lever L is moved in either direction.

The lever L may be secured in any desired position, when the position of the crank is to be controlled by hand, by inserting the pin $f$ through the long arm of said lever, and in either of the holes $e\,e$, which will give the desired movement.

The operation of my improvement is as follows:

The parts being in the position shown, except that the governor is disconnected, and the engine being in operation, if it is found that too great a speed is obtained for the work to be done, it is only necessary to remove the pin $f$, depress the long arm of the lever L, and insert the pin $f$ in the next hole, when, by the action of the cam J upon the plate E, the pin D will be moved nearer to the centre of the shaft G, and thereby reduce the movement of the valve, and consequently diminish the size of the port through which steam is admitted to the cylinder.

When the long arm of the lever L has been depressed until it is in a horizontal position, and the pin $f$ is inserted in the centre hole, the valve will have no movement at all, for the reason that the centre of the crank-pin D will coincide with the axis of the shaft or hub G.

If it is desirable to reverse the engine, as, for instance, when used for marine purposes, the long arm of the lever L is depressed below a horizontal position, and the pin $f$ inserted in either of the holes below the centre one, according to the speed desired.

When used on stationary engines, which always run in the same direction, the governor may be connected to the long arm of the lever L, as shown, and the pin $f$ being removed to leave the lever L free to be moved up or down by the action of the governor-balls, and thus control the movement of the valve in a perfectly obvious manner.

This device is capable of application in a variety of places other than on steam-engines, in fact wherever it is desirable to use a crank-motion, or its equivalent, which may be increased or diminished at pleasure, without stopping the machine.

I do not claim an adjustable crank-pin, broadly, for I am aware that crank-pins have been used before that were capable of being adjusted when the machinery was standing still; but

What I claim as my invention, and desire to secure by Letters Patent, is—

1. The combination of hollow shaft or hub G and the adjustable crank-pin D, when the mechanism for adjusting said crank-pin is operated through said hollow shaft or hub, substantially as described.

2. The combination of the hollow shaft or hub G, the crank-pin D, the disk or plate E, and the cam J, all constructed substantially as described, for the purposes specified.

3. The combination of the cam J, its shaft J', pin $a$, and the sleeve K, provided with the spiral groove or slot $b$, and the lever L, or their mechanical equivalents, substantially as described.

4. The crank-pin D, or its equivalent, having the amount of its throw controlled by the action of the governor-balls N, when the motion of said balls is transmitted to it through the shaft or hub G, on which said crank-pin is mounted, substantially as described.

Executed at Boston, this 22d day of November, 1869.

GEO. M. BIRD.

Witnesses:
DANA B. HANSON,
G. E. WHITNEY.